UNITED STATES PATENT OFFICE.

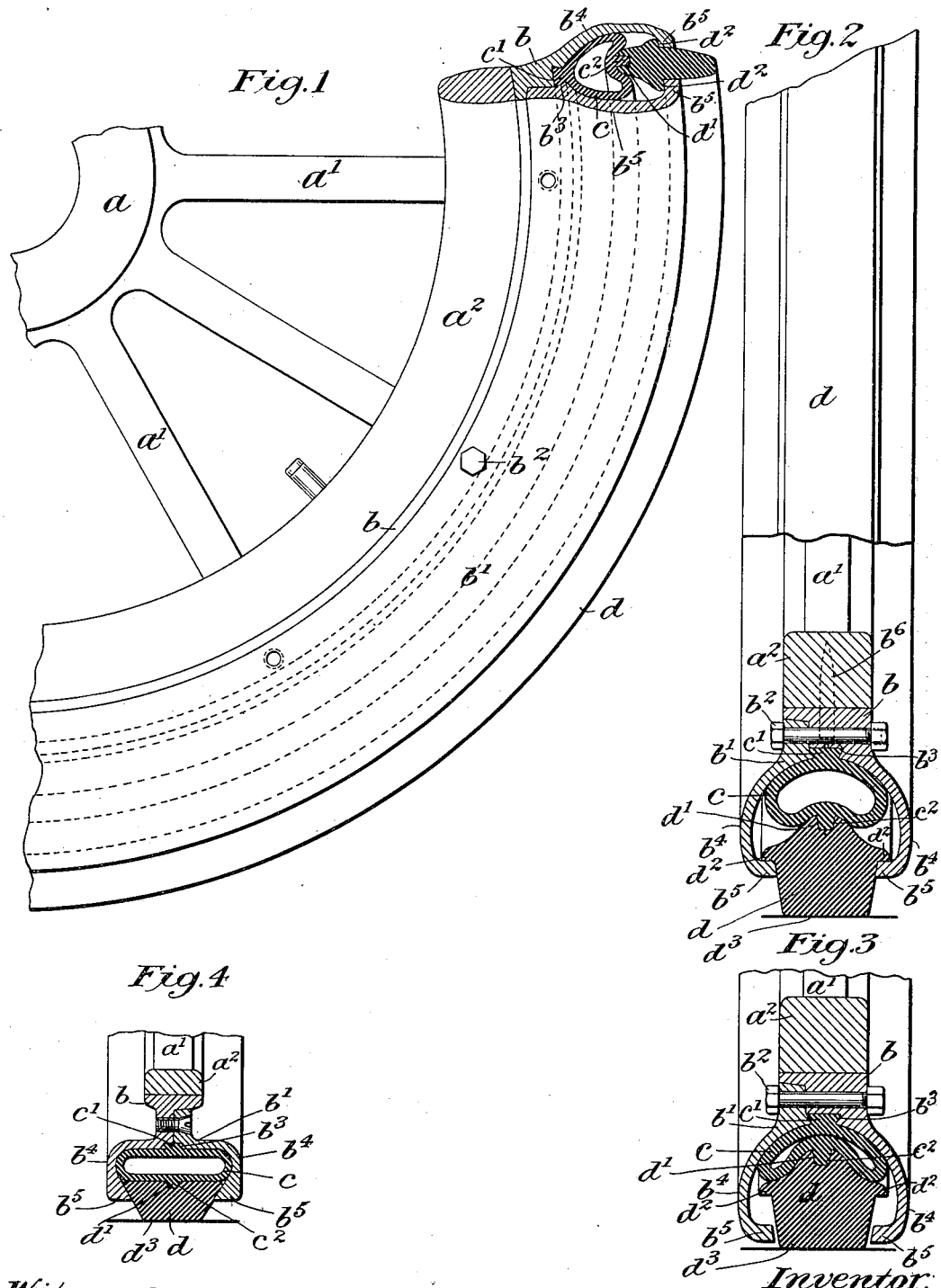

JOHN THOMSON, OF NEW YORK, N. Y., ASSIGNOR TO TRIDENT TIRE COMPANY, OF NEW YORK, N. Y., A CORPORATION OF NEW YORK.

WHEEL.

No. 837,152.   Specification of Letters Patent.   Patented Nov. 27, 1906.

Application filed October 11, 1905. Serial No. 282,255.

*To all whom it may concern:*

Be it known that I, JOHN THOMSON, a citizen of the United States, residing in the borough of Manhattan, in the city of New York, in the State of New York, have invented certain new and useful Improvements in Wheels, of which the following is a specification, reference being had to the accompanying drawings, forming a part hereof.

This invention relates particularly to cushion-tired wheels, and has for its object to provide a tire which shall possess the advantages of a pneumatic tire as to resilience and lightness and the advantages of a solid cushion-tire as to resistance to puncture and ability to withstand severe use. Furthermore, it has been sought to protect the tire against destructive distortion by lateral strains. In accordance with the invention a solid cushion-tread portion is combined with a pneumatic portion, the latter and the inner portion of the former being protected and supported by an inclosing rigid rim through a peripheral opening in which the tread portion projects for contact with the road-surface.

The invention will be more fully described hereinafter with reference to the accompanying drawings, in which it is illustrated as embodied in different forms, and in which—

Figure 1 is a view in side elevation of a portion of a wheel to which the invention is applied, the wheel rim and tire being also shown in section. Fig. 2 is an edge view of a portion of the wheel shown in Fig. 1, partly in radial section. Fig. 3 is a detail view in radial section, as in Fig. 2, but showing the relations of the parts when the wheel meets an obstruction. Fig. 4 is a detail view in radial section, showing a modified embodiment of the invention.

The body of the wheel, represented by the hub $a$, the spokes $a'$, and the felly $a^2$, may be of any usual or preferred construction. In the embodiment of the invention represented in the drawings there is secured to the felly $a^2$ a metal ring $b$, which with its detachable member $b'$ forms a seat for the pneumatic tube $c$. As shown, the ring member $b'$ is seated upon a portion of the main ring $b$ and may be secured in place by bolts or other suitable fastening devices $b^2$. The two parts of the seat-ring $b\ b'$ are preferably so formed as to provide between them a dovetail recess $b^3$. Both the main ring $b$ and the detachable ring $b'$ are provided with cheek-pieces $b^4$, which are extended outwardly and preferably curved, as shown, to accommodate the pneumatic tube $c$, the edges or lips $b^5$ being turned in toward each other to leave between them an opening of less width than the main body of the inclosing and supporting rim thus formed.

The pneumatic tube $c$, of any suitable construction, is preferably provided on its inner face with a molded rib or projection $c'$, adapted to be firmly engaged within the dovetail recess $b^3$ of the rim $b\ b'$. It is also preferably provided on its outer face with a molded rib $c^2$ for engagement with a corresponding recess $d'$, formed in the inner face of the solid cushion-tread portion $d$. The pneumatic tube and the solid cushion-tread portion are preferably secured firmly to each other by cement or otherwise, and such union of the two parts is facilitated by the rib $c^2$ and the recess $d'$. The tread portion $d$ is likewise so formed, as by being provided with projecting flanges $d^2$, as to engage the inwardly-projecting edges of the supporting-rim $b\ b'$ and to be thereby prevented from projection beyond the rim; otherwise the tread portion may have any suitable shape, although it has preferably a truncated wedge shape in cross-section, so that the opening between the edges of the ring $b\ b'$ shall be substantially filled when the tire is in normal condition, as shown in Fig. 2, and shall have immediate clearance between the edges of the rim when the tread meets an obstruction on the road-surface and is thrust toward the axis of the wheel.

In assembling the parts of the structure shown in Figs. 1 and 2 the ring $b$ is first secured to the felly or body of the wheel, as by screws $b^6$. The pneumatic tube $c$ is then slipped upon the ring $b$ and is securely held in place thereon by the application of the ring $b'$, creeping of the tube upon the wheel-body being prevented by this engagement. If the tread $d$ has not been secured previously to the pneumatic tube by cement or otherwise, it is applied and secured, the pneumatic tube being deflated at the time, as its external diameter with reference to the axis of the wheel is somewhat greater than the internal diameter of the tread $d$.

It will be understood that the tread is secured to the tube before the application of the ring $b'$, so that when such ring is applied the two edges thereof shall overlap the widest portion of the tread $b$ and prevent the projection of the tread beyond the rim.

The tube $c$ may have a different cross-section—as shown, for example, in Fig. 4—the rings $b$ and $b'$ being suitably shaped to accommodate the tube. The tread $d^3$ may also have a different shape—as shown, for example, in Fig. 4—in which it has simply a truncated wedge shape in cross-section without projecting ribs or flanges, as in the form shown in Figs. 1, 2, and 3. The shape of the rings $b$ and $b'$ is also modified to suit the shape of the tread portion, the object being to permit the tread portion to yield freely inwardly and to prevent it from being projected beyond the supporting-rim.

It will be understood that as the pneumatic tube is of somewhat greater diameter externally with reference to the axis of the wheel than the tread portion the tube will be slightly compressed by the tread portion when it is applied and that the increase of the air-pressure within the tube will expand the same outwardly and force the tread portion outwardly until the flanges or sides thereof impinge upon the walls of the outer casing or supporting-rim. The tread portion will then be under initial tension and the pneumatic tube will be supported by the metal ring at its inner diameter and by the tread portion at its outer diameter. The casing or support is preferably so shaped with reference to the pneumatic tube as to afford some clearance between the tube and the walls of the rim, as shown in Fig. 2, so that when the wheel runs under normal conditions there will be practically no yielding of the tire other than what would take place in an ordinary solid-rubber tire; but when an obstruction is encountered both portions of the tire will give, the tread portion bending and the tube suffering compression and distortion, as shown in Fig. 3, and compressing the air within the tube, as in an ordinary pneumatic tire. If the inward pressure on the tire is excessive, the inner walls of the tube will be forced together, as shown in Fig. 3, and the composite tire will then act substantially as a solid tire. This will also be the case when the tube is deflated. Furthermore, through the attachment of the tube to the wheel-body and the attachment of the tread portion to the tube there can be no creeping of either portion. As the tube is completely protected against puncture, it can be made of lighter material than an ordinary pneumatic tire and the weight of rubber can be put into the tread portion, whereby pressures are distributed over a greater extent of the tube than in ordinary pneumatic tires, requiring less air-pressure and less strength of material.

I claim as my invention—

1. A wheel having an outer casing or rim one side of which is detachable, said casing having a peripheral opening, a pneumatic tube located within said casing and having an inner and an outer rib, and a solid tread supported on said tube and projecting through the opening in the rim, and having a recess, said inner rib being clamped by the detachable rim to the casing, and said outer rib engaging the recess in the solid tread, substantially as shown and described.

2. A wheel having an outer casing or rim one side of which is detachable, said casing having a peripheral opening, a pneumatic tube of oblate cross-section located therein and having a rib molded thereon by which it is secured to the casing, and a solid cushion-tread supported on and secured to the tube, the arrangement and construction being such that the inner walls of said tube may be forced into contact limiting the pneumatic action when the composite parts will act as a solid cushion-tread, substantially as described.

3. A wheel having an outer casing or rim formed in detachable sections, said casing having a peripheral opening, a solid cushion-tread partially disposed within the casing and projecting through the opening, and a pneumatic tube of oblate section and comparatively limited radial action to support the tread, said tube being clamped between the sections and secured to the solid cushion-tread, substantially as described.

This specification signed and witnessed this 22d day of September, A. D. 1905.

JOHN THOMSON.

In presence of—
  HIRAM C. CROSS,
  W. C. BURKE.